(12) United States Patent
Kim

(10) Patent No.: US 9,857,966 B2
(45) Date of Patent: Jan. 2, 2018

(54) ELECTRONIC DEVICE AND METHOD FOR CONVERTING IMAGE FORMAT OBJECT TO TEXT FORMAT OBJECT

(71) Applicant: Samsung Electronics Co., Ltd., Gyeonggi-do (KR)

(72) Inventor: Geon-Soo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 326 days.

(21) Appl. No.: 14/248,963

(22) Filed: Apr. 9, 2014

(65) Prior Publication Data

US 2014/0333632 A1    Nov. 13, 2014

(30) Foreign Application Priority Data

May 9, 2013   (KR) .................. 10-2013-0052333

(51) Int. Cl.
  *G06F 3/0488*   (2013.01)
  *G06F 3/0486*   (2013.01)
  *G06K 9/20*    (2006.01)

(52) U.S. Cl.
  CPC ........ *G06F 3/0486* (2013.01); *G06F 3/04883* (2013.01); *G06K 9/2081* (2013.01); *G06K 2209/01* (2013.01)

(58) Field of Classification Search
  CPC ...... G06F 3/033; G06F 3/0486; G06F 17/211; G06F 3/04883; G06F 17/243; G06K 9/18; G06T 11/60; G09G 5/24
  See application file for complete search history.

(56) References Cited

U.S. PATENT DOCUMENTS

| 5,881,381 A * | 3/1999 | Yamashita | G06F 17/246 715/209 |
| 6,222,542 B1 * | 4/2001 | Poreh | G06F 9/4443 715/744 |
| 2007/0266319 A1 * | 11/2007 | Matsuo | G06F 9/45512 715/700 |
| 2010/0289757 A1 * | 11/2010 | Budelli | G06F 3/04842 345/173 |
| 2011/0081083 A1 * | 4/2011 | Lee | G06K 9/2081 382/182 |
| 2011/0123115 A1 | 5/2011 | Lee et al. | |

(Continued)

FOREIGN PATENT DOCUMENTS

| CN | 103096161 | 5/2013 |
| EP | 2 306 290 | 4/2011 |
| EP | 2 592 582 | 5/2013 |

OTHER PUBLICATIONS

European Search Report dated Jul. 7, 2015 issued in counterpart application No. 14167092.7-1972, 12 pages.

*Primary Examiner* — Gregory J Tryder
*Assistant Examiner* — Diane Wills
(74) *Attorney, Agent, or Firm* — The Farrell Law Firm, P.C.

(57) ABSTRACT

An electronic device and a method for converting an image format object to a text format object are provided. The method includes selecting a region within an object displayed on a first screen; converting an image format object included inside the selected region to a text format object; and displaying the converted text format object on a second screen as an object that is inputtable to an input window of the second screen.

20 Claims, 10 Drawing Sheets

(56) References Cited

U.S. PATENT DOCUMENTS

2011/0252402 A1* 10/2011 Sanoy ................ G06F 3/04845
  717/120
2012/0131520 A1*  5/2012 Tang .................. G06F 3/04883
  715/863

* cited by examiner

ELECTRONIC DEVICE AND METHOD FOR CONVERTING IMAGE FORMAT OBJECT TO TEXT FORMAT OBJECT

PRIORITY

This application claims priority under 35 U.S.C. §119(a) to a Korean patent application filed in the Korean Intellectual Property Office on May 9, 2013 and assigned Serial No. 10-2013-0052333, the entire content of which is incorporated herein by reference.

BACKGROUND OF THE INVENTION

1. Field of the Invention

The present invention relates generally to image format conversion, and more particularly, to an electronic device and a method for converting an image format object to a text format object.

2. Description of the Related Art

Information obtained using an electronic device may be included in an image format file. This image format file cannot be converted to a text format at the electronic device, which is inconvenient for users.

For example, when a user has to input a serial number included in an image format file included in a received short message to a different application, a conventional electronic device cannot load only the serial number in the different application, and therefore, the user manually make a note of the serial number one digit at a time, which is inconvenient for the user.

SUMMARY OF THE INVENTION

An aspect of the present invention is to address at least the above-mentioned problems and/or disadvantages and to provide at least the advantages described below.

Accordingly, an aspect of the present invention is to provide an apparatus and a method for improving a user's convenience by automatically converting specific information included in an image format file to a text format using an optical character recognition function.

Another aspect of the present invention is to provide an apparatus and a method for minimizing a user's interaction and thus improving efficiency by discriminating relevant information every field and converting the information to a text format so that a different application may individually input the information to an input window in the case where a field of the specific information included in an image format file is divided.

In accordance with an aspect of the present invention, a method for operating an electronic device for converting an image format object to a text format object is provided. The method includes selecting a region within an object displayed on a first screen; converting an image format object included inside the selected region to a text format object; and displaying the converted text format object on a second screen as an object that is inputtable to an input window of the second screen.

In accordance with another aspect of the present invention, an electronic device for converting an image format object to a text format object is provided. The electronic device includes a touchscreen for selecting a region within an object displayed on a first screen, and displaying a converted text format object on a second screen as an object that is inputtable to an input window of the second screen; and a processor module for converting an image format object included inside the selected region to a text format object.

BRIEF DESCRIPTION OF THE DRAWINGS

The above and other aspects, features and advantages of certain embodiments of the present invention will be more apparent from the following description taken in conjunction with the accompanying drawings in which.

DETAILED DESCRIPTION OF EMBODIMENTS OF THE PRESENT INVENTION

Figure 1A:
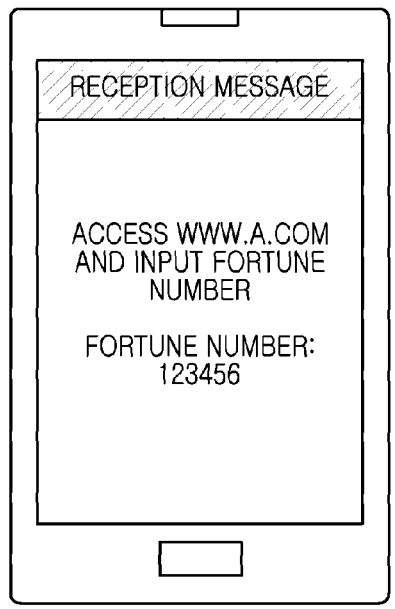
FIGS. 1A, 1B, 1C and 1D are diagrams illustrating a process performed by an electronic device for converting an image format object to a text format object according to an embodiment of the present invention.

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used to enable a clear and consistent understanding of the invention. Accordingly, the following description of embodiments of the present invention is merely provided for illustration purposes, and do not limit the invention as defined by the appended claims and their equivalents. Throughout the drawings, like reference numerals may refer to like parts, components and structures.

FIGS. 1A-1D are diagrams illustrating a process performed by an electronic device for converting an image format object to a text format object according to an embodiment of the present invention. First, as illustrated in FIG. 1A, the electronic device receives image format information including specific information. For example, the electronic device may receive a short message including specific information, a web browser, and image format information such as a photo and a Social Network Service (SNS In the example of FIG. 1A, the electronic device has received, from another electronic device, a short message including image information that depicts the message:

ACCESS WWW.A.COM AND INPUT FORTUNE NUMBER
FORTUNE NUMBER:
123456

In the present example, a user of the electronic device intends to access a web site "www.A.com" and input only information of "123456", which is the fortune number, from among the above-cited short message content.

Figure 1B:
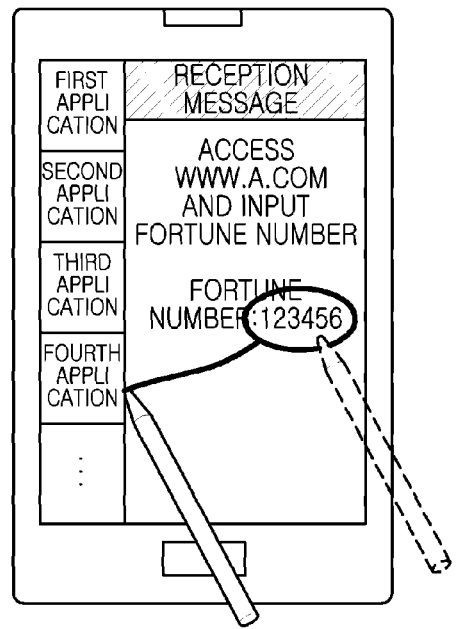

After receiving the short message, as illustrated in FIG. 1B, as user of the electronic device is able to arbitrarily select a region from among an object displayed on the first screen. More specifically, the electronic device allows an input tool to select specific information from among image format information displayed on the first screen. For example, as illustrated in FIG. 1B, the electronic device the input tool is used to select "123456", which is the fortune number depicted among the image format information included in the received message.

After the specific information from among the displayed image format information is selected, the electronic device recognizes an image format object included inside a selected region using an optical character recognition function, and then stores the recognized image format object in one of at least one set region. More specifically, when at least one storage region is displayed on the first screen of the electronic device, the electronic device enables the user to drag and move the image format object recognized using an optical character recognition function to one of the storage regions. For example, as illustrated in FIG. 1B, the electronic device enables the user to drag and move an image format object of "123456" recognized using the optical character recognition function to a storage region of a "fourth application" among storage regions displayed on a set region of the first screen. Accordingly, the dragged and moved image format object of "123456" is stored in the "fourth application".

After the object is dragged and moved to a storage region, the electronic device may stop displaying the first screen depicted in FIGS. 1A-1B, start displaying a second screen, and then call the stored image format object. More specifically, the electronic device stops displaying the first screen displayed on the touchscreen of the electronic device, and then displays the second screen to call the image format object from the storage region in which the image format object has been stored, so that the image format object is displayed on the second screen. In the above example, the electronic device receives an instruction to stop displaying a reception message window, receives an instruction for executing a web browser to access the web site "www.A.com", and then receives an instruction for calling the image format object of "123456" stored in the "fourth application" to a web browser window.

Next, the electronic device converts the image format object included inside the selected region to a text format object. More specifically, the electronic device automatically converts the selected image format object on the first screen to a text format object so that the image format object may be immediately input to the input window of the second screen. In the above example, since the object of "123456" stored in the "fourth application" of the electronic device is an image format object that cannot be immediately input to the input window of the web site of "www.A.com", the electronic device converts the image format object of "123456" into a text format object, so that the text-formatted version of the object "123456" is immediately input to the input window of the web site.

Figure 1C:
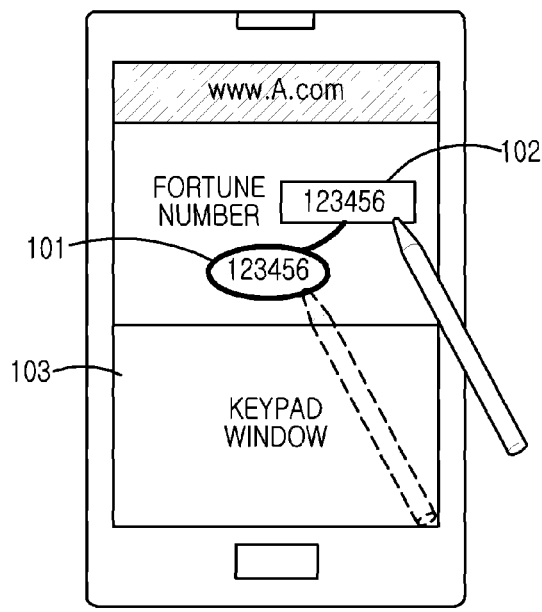

Next, as illustrated in FIG. 1C, the electronic device displays the converted text format object, such that the converted text format object is displayed on the second screen, while the text of the converted text formatted object input to the input window of the second screen. More specifically, the electronic device allows the converted text format object on the second screen such that the text format object does not overlap the input window displayed on the second screen and is input to the input window of the second screen, while allowing the converted text format object to be displayed on the second screen such that the converted text format object does not overlap a pop-up window displayed on the second screen. When displaying a keypad window on the second screen, the electronic device allows the text format object to be displayed on the second screen such that it does not overlap the keypad window. For example, as illustrated in FIG. 1C, the electronic device displays a converted text format object 101 such that the converted text format object 101 does not overlap an input window 102 for receiving a fortune number of "123456", and a keypad window 103 for receiving a character, a symbol, a emoticon, etc.

Figure 1D:
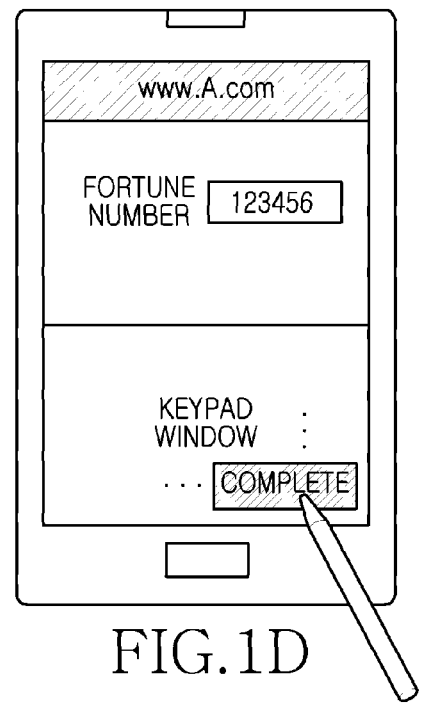

Next, the electronic device recognizes a gesture regarding the text format object 101 from an input tool to determine the text format object 101 has been input to the input window 102 of the second screen. More specifically, the electronic device receives user input for dragging the text format object 101 to the input window 102 of the second screen, receives input for releasing the dragged text format object 101 on the input window 102 of the second screen, and then determines the text format object 101 has been input to the input window 102. In the above example, the electronic device allows an input tool to select the text format object 101, detect drag and release operations to the input window 102, and determine the object of "123456" has been input to the input window 102. Finally, as illustrated in FIG. 1D, when the electronic device allows the input tool to select a complete button positioned on the keypad window, the electronic device transmits the fortune number of "123456", which has been input to the input window of the web site of "www.A.com", to a related server. Here, the electronic device may immediately display the text format object on the second screen, but may additionally display the stored image format object on the second screen without alteration. More specifically, the electronic device may recognize a gesture regarding the image format object from the input tool, determine to convert the image format object to the text format object 101 when the image format object is released on the input window 102 of the second screen, and then determine the converted text format object 101 has been input to the input window 102 of the second screen.

A conventional electronic device may capture an entire image format object, but cannot selectively convert specific information included in the image format object to a text format. Therefore, a user of a conventional electronic device must inconveniently write down information of interest included in the image format object on a different paper one by one via a manual operation.

However, an electronic device according to an embodiment of the present invention has an advantage of improving a user's convenience by allowing the user to select information of interest included in the image format object, and then automatically convert the selected information of interest to a text format. More specifically, since when an electronic device according to an embodiment of the present invention stores an image format object selected by an input tool in a set storage place on the first screen, the stored information is automatically converted to a text format so that the information may be input to the input window of the second screen, the user has an advantage of easily utilizing the stored object by only calling the stored object on the second screen.

FIGS. 2A-2D is are diagrams illustrating a process for allowing a user to select an arbitrary region among an image format object and storing the same in a set region in an electronic device according to an embodiment of the present invention. In the following example, it is assumed that the electronic device accesses a web site of a "restaurant A" and in order to store a menu of items currently sold in the "restaurant A".

Figure 2A:
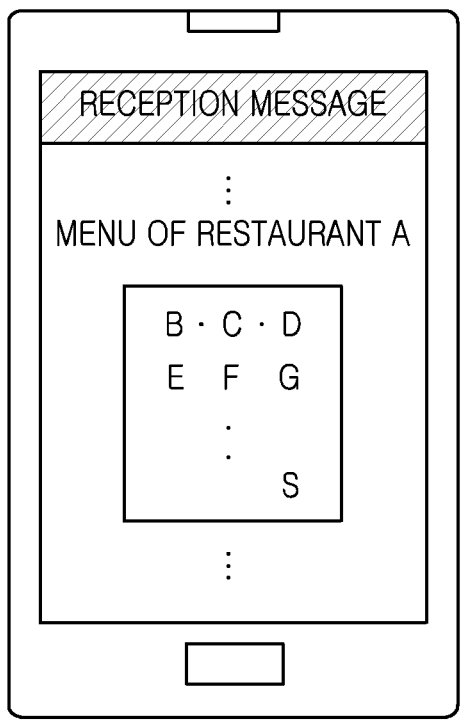
FIGS. 2A, 2B, 2C and 2D are diagrams illustrating a process for allowing a user to select an arbitrary region among an image format object and storing the same in a set region in an electronic device according to an embodiment of the present invention.

First, as illustrated in FIG. 2A, the electronic device receives an instruction to access a web site of the "restaurant A" and accordingly accesses the web site. After the initial access to the website, the electronic device may receive an instruction to retrieve and display at least a portion of contents of the web site of the "restaurant A". For example, the electronic device may receive a touch input instructing the electronic device to magnify, demagnify, scroll up, and scroll down an image displayed on the touchscreen of the electronic device.

Figure 2B:
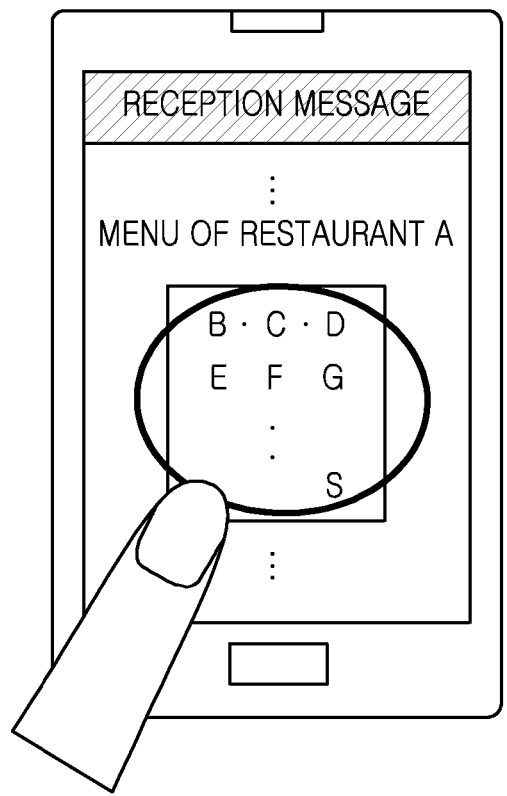

Next, as illustrated in FIG. 2B, the electronic device receives, from the input tool, input for selecting an arbitrary region among an image format object displayed on the touchscreen of the electronic device. For example, as illustrated in FIG. 2B, the electronic device may receive input for selecting information of interest ranging from "B to S" among an image format object of "menus B to S of the restaurant A" posted on the web site of the "restaurant A".

Figure 2C:
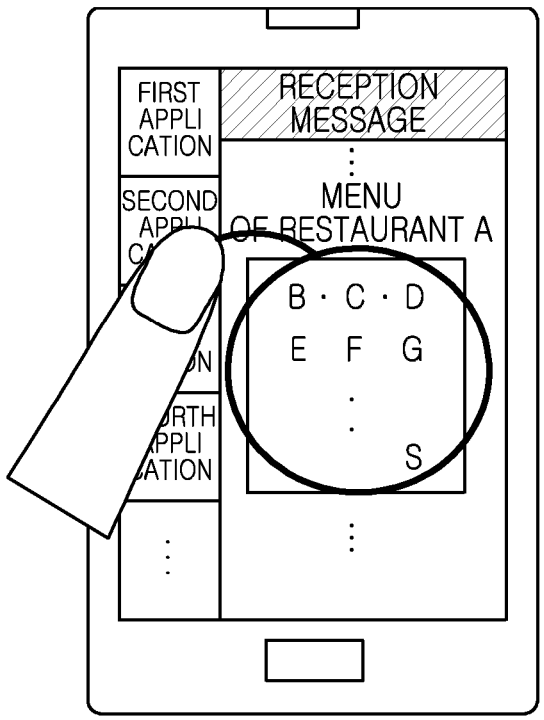

Next, as illustrated in FIG. 2C, the electronic device recognizes an image format object included inside a selected region using an optical character recognition function, and then stores the recognized image format object in one of at least one set region. More specifically, when at least one storage region is displayed on the touchscreen of the electronic device, the electronic device may receive input for dragging and moving the image format object recognized using the optical character recognition function to one of the storage regions. For example, as illustrated in FIG. 2C, when the electronic device receives user input for selecting a range from "B to S" among the image format object of the "menus B to S of the restaurant A", the electronic device displays at least one storage region on the touchscreen of the electronic device, and then recognizes a gesture dragging the selected object to a "second application". In the present example, the image format object of "B to S" dragged and moved to the "second application" is stored in the "second application".

Figure 2D:
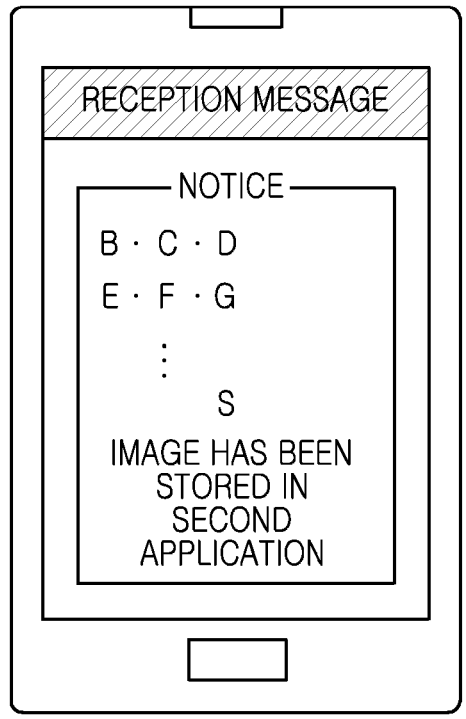

Next, as illustrated in FIG. 2D, the electronic device displays a notice message representing the image format object moved to the storage region has been stored in the moved storage region. For example, as illustrated in FIG. 2D, the electronic device display a notice message stating, "B to S images have been stored in the second application" on the touchscreen of the electronic device.

FIGS. 3A-3D are diagrams illustrating a process for allowing a user to select an arbitrary region among an image format object and storing the same in a set region in an electronic device according to another embodiment of the present invention. In the following example, it is assumed that the electronic device accesses a web site of a "department store A" in order to store a representative phone number of the "department store A".

Figure 3A:
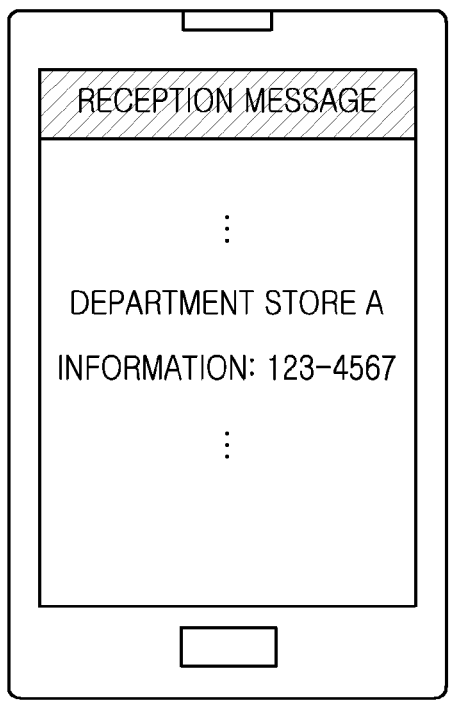
FIGS. 3A, 3B, 3C and 3D are diagrams illustrating a process for allowing a user to select an arbitrary region among an image format object and storing the same in a set region in an electronic device according to another embodiment of the present invention.

First, as illustrated in FIG. 3A, the electronic device receives an instruction to access the web site of the "department store A". Next, the electronic device receives an instruction for instructing to retrieve the web site of the "department store A" and to display contents posted on the web site of the "department store A" according to the received instruction. For example, the electronic device may receive a touch input for instructing to magnify, demagnify, scroll up, and scroll down an image displayed on the touchscreen of the electronic device, and perform the received instruction.

Figure 3B:
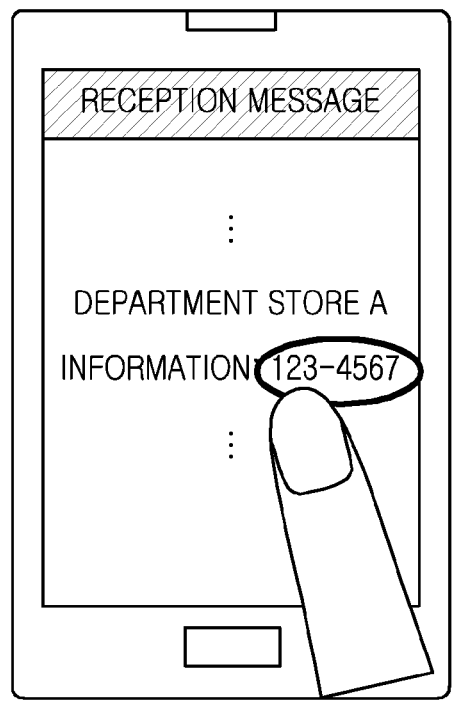

Next, as illustrated in FIG. 3B, the electronic device receives, from the input tool, input for selecting an arbitrary region among an image format object displayed on the touchscreen of the electronic device. For example, as illustrated in FIG. 3B, the electronic device receives, from the input tool, input for selecting information of interest of "123-4567", which is a representative phone number of the department store A, from among the image format object of the department store A posted on the web site of the "department store A".

Figure 3C:
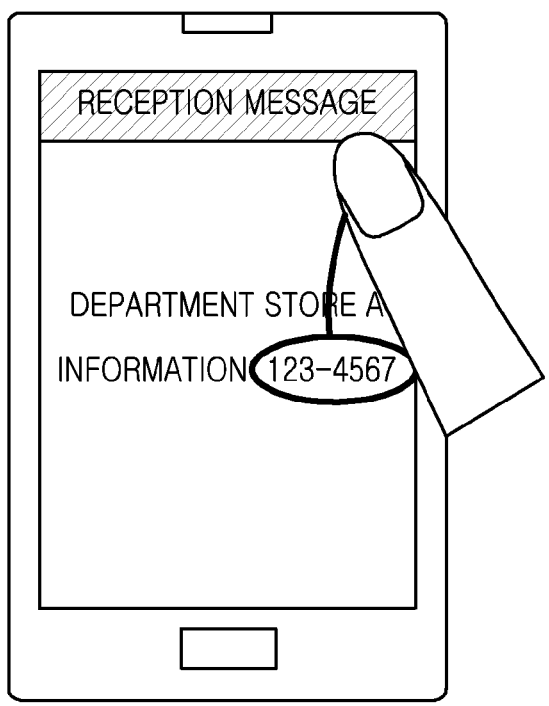

Next, as illustrated in FIG. 3C, the electronic device recognizes an image format object included in the selected region using an optical character recognition function, and then stores the recognized image format object in a set region. More specifically, when at least one storage region is displayed on the touchscreen of the electronic device, the electronic device may drag and move the image format object recognized using the optical character recognition function to the set storage region. For example, as illustrated in FIG. 3C, when the electronic device receives user input for selecting "123-4567", which is the representative phone number of the department store A among the image format object of the department store A posted on the web site of the "department store A", the electronic device may recognize a gesture dragging the selected object to an "indicator zone". More specifically, when the electronic device does not support a multi-task function that cannot display at least one set storage region on the touchscreen of the electronic device, the electronic device recognizes a gesture dragging the selected object to the set storage region such as the indicator zone.

Here, the image format object of "123-4567", which is the representative phone number of the department store A dragged and moved to the "indicator zone", may be stored in the set storage region. For example, when receiving input from the input tool to select an arbitrary region among the image format object, the electronic device separately stores only the selected object in a folder storing only the selected image format.

Figure 3D:
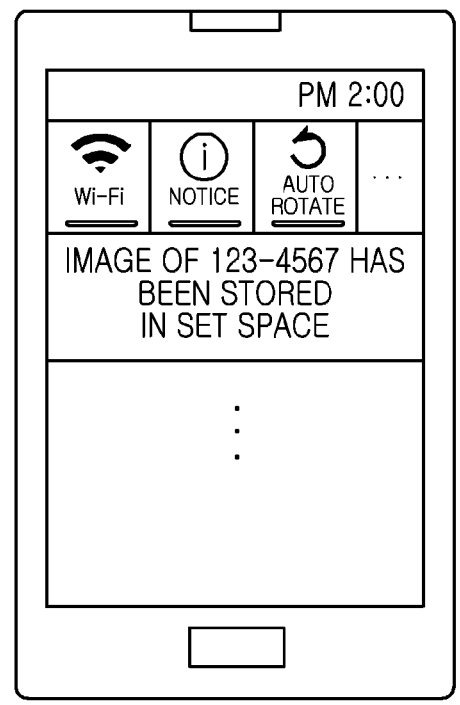

Next, as illustrated in FIG. 3D, after receiving user input for selecting a specific region, the electronic device displays a confirm message for confirming the image format object moved to the storage region has been stored in the set storage region. For example, as illustrated in FIG. 3D, when the user provides input for selecting an indicator zone, the electronic device displays a confirm message saying "the image of 123-4567 has been stored in the set space" on the touchscreen of the electronic device.

FIGS. 4A-4D are diagrams illustrating a process for inputting an object displayed on a second screen to an input window according to another embodiment of the present invention. In the following example, it is assumed the electronic device has received a short message stating "access www.A.com, and then input a twelve-digit coupon number of 123-456-789-abc to receive a giveaway". It is further assumed that the electronic device has also stored an image format object of "123-456-789-abc", which is a twelve-digit coupon number among the above short message in the set storage region. It is further assumed that the electronic device has also accessed a web site of "www.A.com" and called a text of "123-456-789-abc" stored in the set storage region. The embodiment of the present invention corresponding to FIGS. 4A-4D is described in more detail based as follows in view of the above suppositions.

Figure 4A:
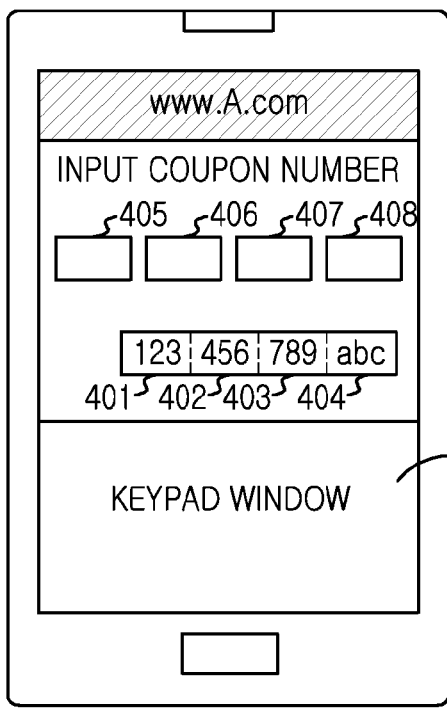
FIGS. 4A, 4B, 4C and 4D are diagrams illustrating a process for inputting an object displayed on a second screen to an input window according to another embodiment of the present invention.

First, as illustrated in FIG. 4A, the electronic device stops displaying a first screen, starts displaying a second screen, and then calls the stored image format object. More specifically, the electronic device receives an input for ending display of the first screen, and then displays the second screen to call the stored image format object from the storage region in which the image format object has been stored so that the image format object may be displayed on the second screen. In the above example, the electronic device receives an instruction for ending a reception message window, executing a web browser to receive an instruction for instructing to access a web site of "www.A.com", and then receives an instruction for calling the image format object of "123-456-789-abc" stored in the set storage region to the web browser window.

Next, the electronic device converts the image format object included inside the selected region to a text format object. More specifically, the electronic device automatically converts the image format object selected from the first screen to a text format object so that the text format object may be immediately input to the input window of the second screen. In the above example, since the object of "123-456-789-abc" stored in the set region of the electronic device is an image format object that cannot be immediately input to the input window of the web site of "www.A.com", the electronic device converts the image format object into a text format object of "12345678abc" where "-", which is a separator, has been deleted, so that the text format object may be immediately input to the input window of the web site.

Also, since the automatically converted text format object of "123456789abc" is divided into four input field values, the electronic device may divide the text format object and provides the respective divided portions of the text format object into the four input field values and displays the divided portions on the touchscreen. More specifically, the electronic device divides the text format object of "123456789abc" into "123", "456", "789", and "abc", and displays the divided portions on the touchscreen of the electronic device.

The electronic device may display the converted text format object such that the text format object on the second screen and is input to the input window of the second screen. More specifically, the electronic device allows the converted text format object to be displayed on the second screen such that the text format object does not overlap the input window displayed on the second screen, while also being input to the input window of the second screen. When the keypad window is also displayed on the second screen, the electronic device displays the text format object on the second screen so that the text format object does not overlap the keypad window. For example, as illustrated in FIG. 4A, the electronic device displays the objects 401 to 404, which are converted to the text format, such that they do not overlap the input windows 405 to 408 for receiving the text format objects, and the keypad window 409 for receiving a character, a symbol, an emoticon, etc.

Figure 4B:
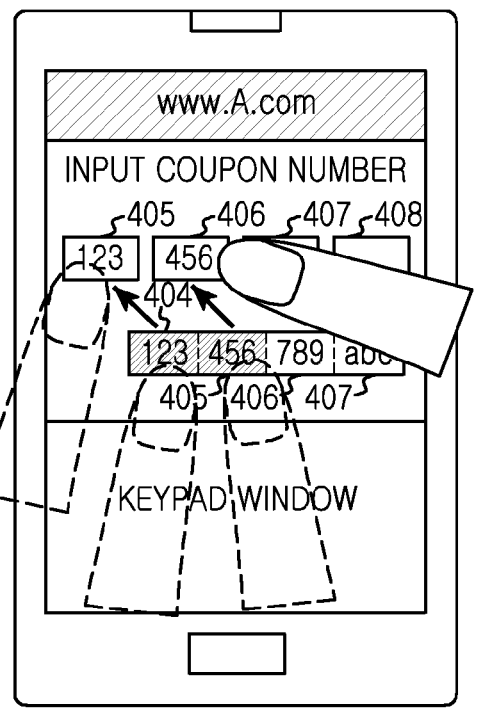
Figure 4C:
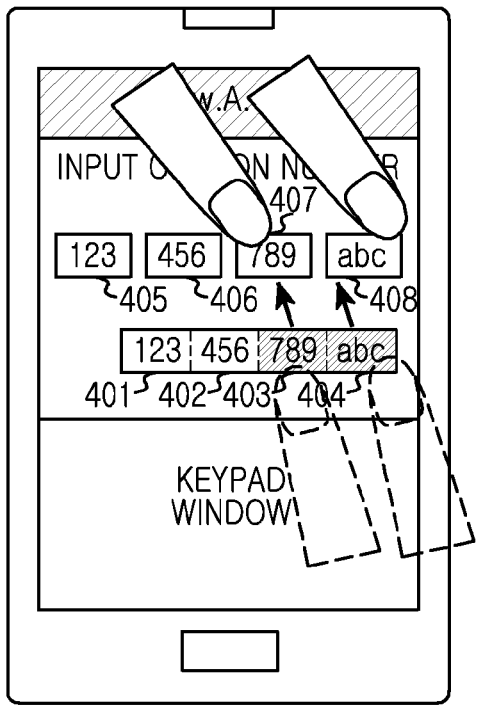

Next, as illustrated in FIGS. 4B and 4C, the electronic device recognizes an input gesture regarding the text format objects 401 to 404 from the input tool, and determines that the text format objects have been input to the input windows 405 to 408 of the second screen. More specifically, the electronic device receives input for dragging the text format objects 401 to 404 that overlap on the second screen to the input windows 405 to 408 of the second screen, and receives input releasing the text format objects 401 to 404 on the input windows 405 to 408 of the second screen, and then determines that the objects 401 to 404 have been input to the input windows 405 to 408.

Figure 4D:
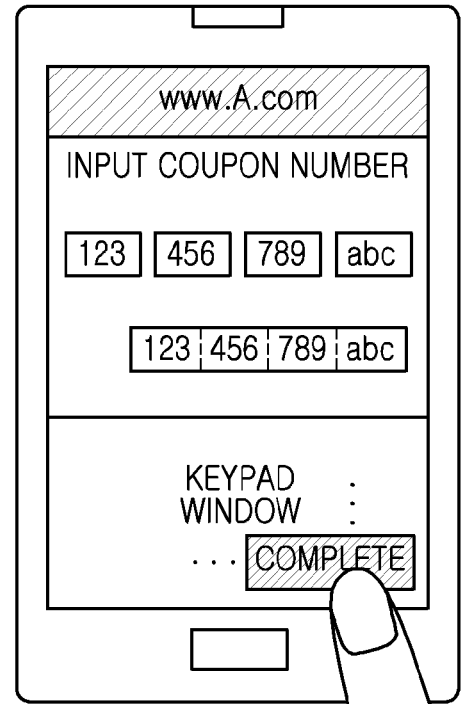

In the above example, the electronic device allows the input tool to select the text format objects 401 to 404 of "123", "456", "789", and "abc" sequentially, detects input corresponding to a drag and release with respect to the input windows 405 to 408 divided to the four fields, and accordingly determines that the objects 401 to 404 of "123", "456", "789", and "abc" have been sequentially input to the input windows 405 to 408. Next, as illustrated in FIG. 4D, when the electronic device allows the input tool to select a complete button positioned on the keypad window, the electronic device transmits, to a related server, the coupon number of "123", "456", "789", and "abc" input to the input window of the web site of "www.A.com".

Figure 5C:
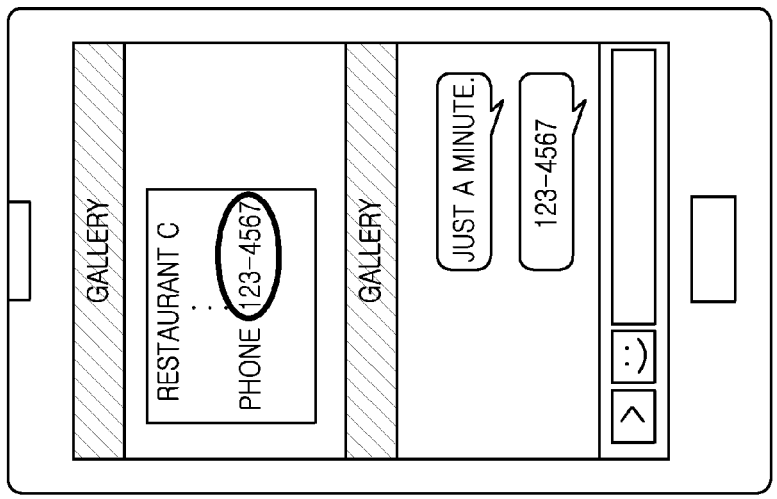
FIGS. 5A, 5B and 5C are diagrams illustrating a process for selecting an object displayed on a first screen and immediately inputting the same to an input window of a second screen according to another embodiment of the present invention.
Figure 5B:
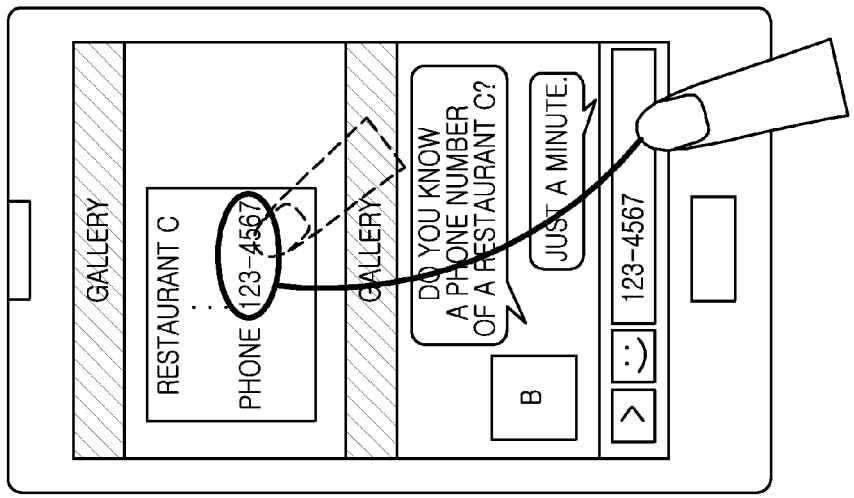
Figure 5A:
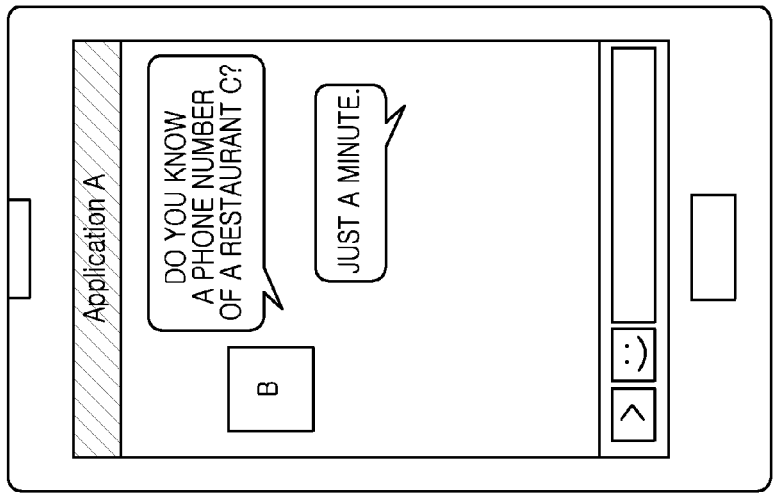

FIGS. 5A-5D are diagrams illustrating a process for selecting an object displayed on a first screen and immediately inputting the same to an input window of a second screen according to another embodiment of the present invention. First, as illustrated in FIG. 5A, it is assumed that the electronic device transmits/receives dialog content to/from another electronic device using an "application A" which is a dialog application, and another electronic device that transmits/receives the dialog content to/from the electronic device cannot access a web site currently. It is also assumed that a user of another electronic device that transmits/receives the dialog content to/from the electronic device has asked a user of the electronic device about a phone number of a "restaurant C". It is also assumed that the electronic device has shot a leaflet on which a menu, a phone number, etc. of the "restaurant C" have been printed using a camera provided to the electronic device.

Next, as illustrated in FIG. 5B, the electronic device, which can simultaneously execute a plurality of application windows, executes a photo storage space entitled "gallery" where a photo of the leaflet containing the menu, the phone number, etc. of the "restaurant C" has been stored and a window of the "application A", simultaneously. Next, the electronic device retrieves the storage space of the "gallery" in which photos of the electronic device are stored to select a photo of the leaflet of the "restaurant C", and then receives, via the input tool (i.e., a user's finger in the present example), input for selecting "123-4567", which is the phone number of the "restaurant C" included in the photo.

Next, the electronic device detects a gesture for inputting the selected "123-4567", which is the phone number of the "restaurant C", to the input window of the executed "application A" positioned right below the "gallery" window. More specifically, the electronic device receives, from the input tool, input for dragging and releasing the "123-4567" to the input window of the "application A".

Next, as illustrated in FIG. 5C, when the electronic device automatically converts the "123-4567" which is positioned on the input window of the "application A" to a text format object, and then transmits the text format object so that a user of another electronic device views the text format object Accordingly, the electronic device enables another electronic device to display the phone number of the "restaurant C" via the "application A".

When the electronic device according to the above-described embodiment of the present invention selects specific information included in an image format object and only inputs the specific information to the input window of a different application, the electronic device automatically converts the image format object to a text format object, thereby increasing convenience to a user.

FIGS. 6A-6D are diagrams illustrating a process of calling a phone number stored in a specific region and immediately trying communication in an electronic device according to another embodiment of the present invention. In the following example, it is assumed that a phone number of "012-345-6789" is stored in a storage space of a "memo pad" of an electronic device, and the electronic device executes a communication application that is currently attempting to perform communication.

Figure 6A:
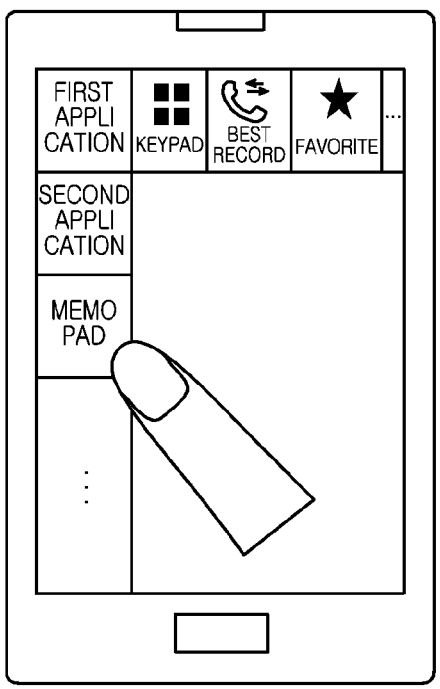
FIGS. 6A, 6B, 6C and 6D are diagrams illustrating a process of calling a phone number stored in a specific region and immediately trying communication in an electronic device according to another embodiment of the present invention.
Figure 6B:
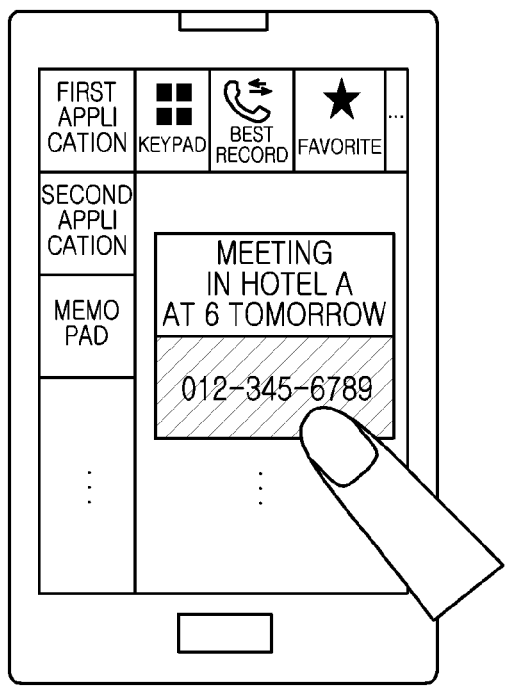

As illustrated in FIGS. 6A and 6B, the electronic device displays, on a touchscreen of the electronic device, a storage space capable of retrieving a plurality of applications. Then, the electronic device receives user input for selecting the storage space of the "memo pad" from among the plurality of displayed applications. Next, the electronic device converts at least one image format object stored in the selected storage space of the "memo pad" to a text format object, and displays the converted text format object on the touchscreen of the electronic device. In the present example, the electronic device displays text format objects such as "meeting in a hotel A at 6 tomorrow" and "012-345-6789" on the touchscreen of the electronic device.

Next, the electronic device receives user input for selecting one text format object from among the text format objects displayed on the touchscreen of the electronic device. In the present example, the electronic device receives user input for selecting "012-345-6789" from among the text format objects displayed on the touchscreen of the electronic device.

Figure 6C:
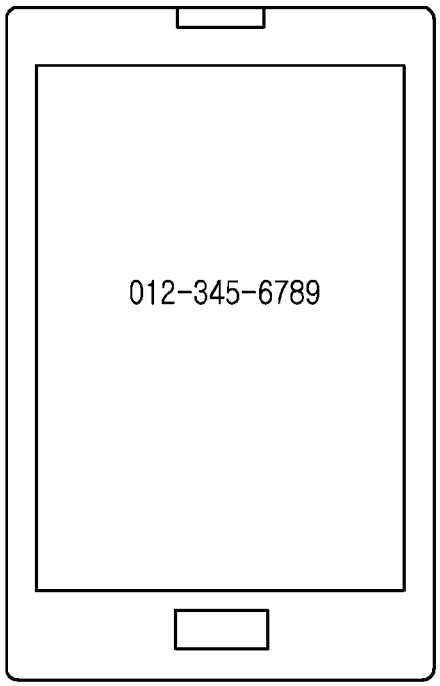
Figure 6D:
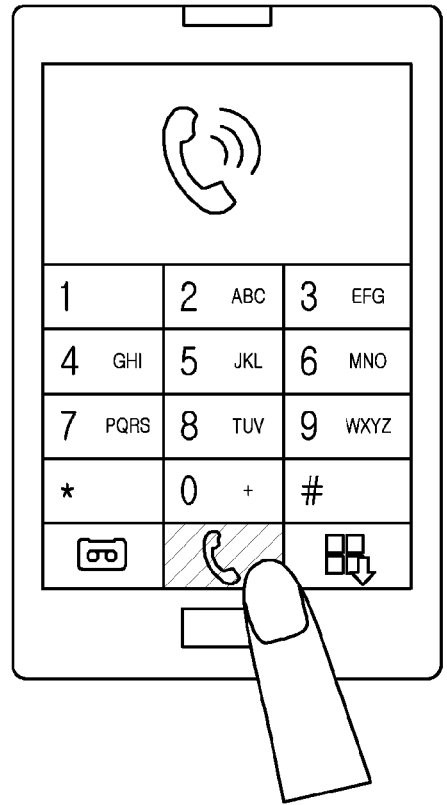

Next, as illustrated in FIGS. 6C and 6D, when the electronic device displays the selected text format object on a communication application, and then receives a user input for selecting a communication button displayed on the keypad window, the electronic device attempts communication based upon the selected phone number. For example, when the electronic device displays the phone number of "012-345-6789" on the communication application and then receives user input for selecting the communication button displayed on the keypad window, the electronic device attempts communication based on the phone number of "012-345-6789".

When attempting communication based on a phone number stored in a storage space of a conventional electronic device, a user is inconveniently required to move a relevant phone number to a different place, and then input the moved phone number manually when a communication application is executed.

However, when an electronic device according to the above-described embodiment of the present invention calls an image format phone number stored in a storage space of the electronic device via a communication application and only selects the relevant phone number, the automatically attempts communication (i.e., calling the phone number), so that the user's convenience improves.

FIGS. 7A-7D are diagrams illustrating a process of selecting again a text format object selected in an electronic device according to an embodiment of the present invention. First, suppose phone numbers of "1234-5678", "012-345-6789", etc. are stored in a storage space of a "memo pad' of the electronic device, and the electronic device has executed a communication application that may try communication currently.

Figure 7A:
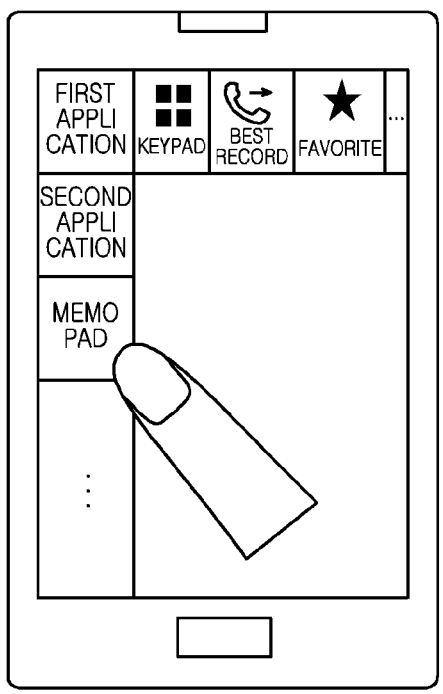
FIGS. 7A, 7B, 7C and 7D are diagrams illustrating a process of selecting again a text format object selected in an electronic device according to another embodiment of the present invention.
Figure 7B:
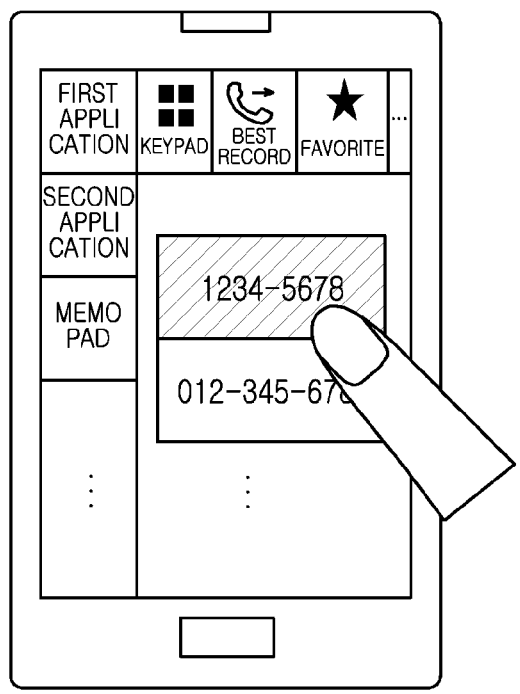

As illustrated in FIGS. 7A and 7B, the electronic device displays a storage space capable of retrieving a plurality of applications on the touchscreen of the electronic device, and then receives user input for selecting the storage space of the "memo pad" among the plurality of displayed applications. Next, the electronic device converts at least one image format object stored in the selected storage space of the "memo pad" to a text format object, and displays the converted text format object on the touchscreen of the electronic device. For example, the electronic device displays text format objects such as "1234-5678" and "012-345-6789" on the touchscreen of the electronic device.

Next, the electronic device allows a user to select one text format object from among the text format objects displayed on the touchscreen of the electronic device. In the present example, the electronic device receives user input for selecting the object of "012-345-6789" from among the text format objects such as "1234-5678" and "012-345-6789" displayed on the touchscreen of the electronic device.

Figure 7C:
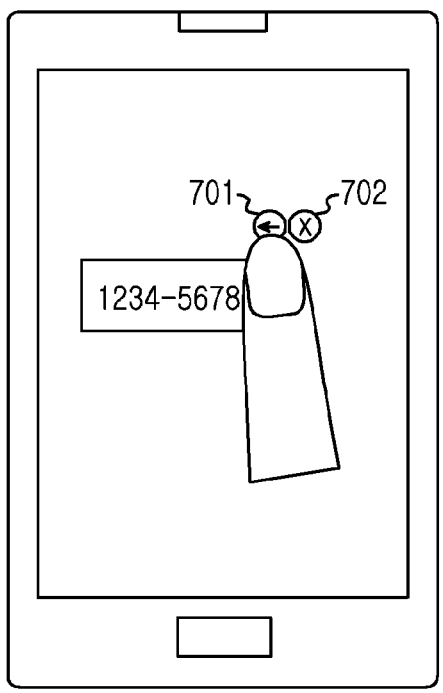
Figure 7D:
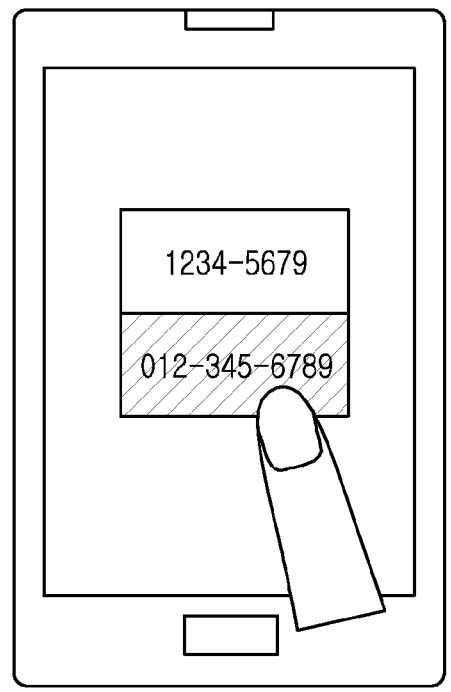

Next, as illustrated in FIGS. 7C and 7D, the electronic device displays an icon 701 for returning to a screen previously displayed before the selection together with the selected text format object and an icon 702 for deleting the displayed text format object.

As illustrated in FIG. 7C, when receiving a touch input of the icon 701 for returning to the screen before selection, the electronic device re-displays the text format objects previously displayed before selection such as "1234-5678" and "012-345-6789".

Next, as illustrated in FIG. 7D, the electronic device receives a user selection of the object of "012-345-6789" again from among the text format objects "1234-5678" and "012-345-6789" displayed on the touchscreen of the electronic device. When the electronic device receives a user selection of one object among objects displayed on the touchscreen, the electronic device displays the icon 701 for returning to the screen previously displayed before the selection and the icon 702 for deleting a displayed text format object together with the text format objects, thereby reducing the user's interaction.

Figure 8:
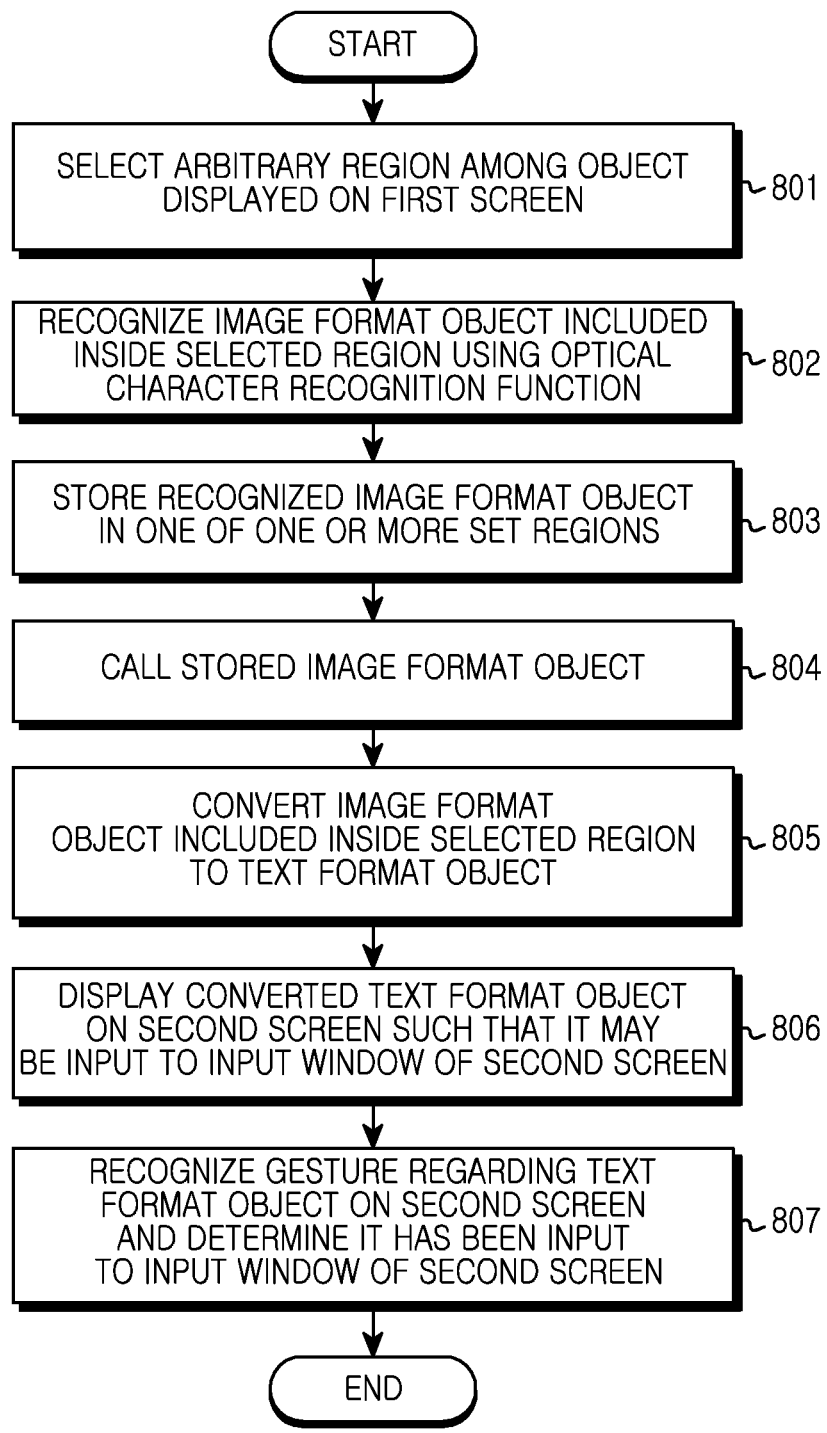
FIG. 8 is a flowchart illustrating an operation sequence of an electronic device according to an embodiment of the present invention.

FIG. 8 is a flowchart illustrating an operation sequence of an electronic device according to an embodiment of the present invention.

Referring to FIG. 8, first, the electronic device may select an arbitrary region among objects displayed on a first screen, at step 801. More specifically, the electronic device receives, from an input tool, a selection of specific information from among image format information displayed on the first screen.

Next, the electronic device recognizes an image format object included inside the selected region using an optical character recognition function, at step 802. For example, when the electronic device allows a user to select a menu of a "restaurant A" from among an image format object posted on a web site of the "restaurant A" on the touchscreen of the electronic device, the electronic device recognizes the menu of the "restaurant A", which is the selected image format object, using an optical character recognition function.

Next, the electronic device stores the recognized image format object in one of at least one set regions, at step 803. More specifically, when at least one storage region is displayed on a first screen of the electronic device, the electronic device receives input for dragging and moving the image format object recognized using the optical character recognition function to one of the storage regions.

Next, the electronic device performs a call according to the stored image format object, at step 804. More specifically, the electronic device stops displaying the first screen displayed on the touchscreen of the electronic device, and then displays a second screen depicting a call corresponding to the image format object from the storage region in which the image format object has been stored, so that the image format object is displayed on the second screen. More specifically, the electronic device receives a selection of the storage region where the image format object has been stored, in order to receive a selection of one of at least one image format object stored in the storage region.

Next, the electronic device converts an image format object included inside the selected region to a text format object, at step 805. More specifically, the electronic device automatically converts the image format object selected from the first screen to a text format object so that the image format object is immediately input to the input window of the second screen.

Next, the electronic device displays the converted text format object on the second screen so that the text format object is input to the input window of the second screen, at step 806. More specifically, the electronic device displays the converted text format object such that it does not overlap the input window displayed on the second screen, and so that the converted text format object may be input to the input window of the second screen. When a keypad window is also displayed on the second screen, the electronic device displays the text format object such that the text format object does not overlap the keypad window.

Next, the electronic device recognizes a gesture input for the text format object that overlaps the second screen and accordingly determines to input the text format object to the input window of the second screen, at step 807. More specifically, the electronic device receives an input for dragging the text format object that is displayed on the second screen to the input window of the second screen, receives an input releasing the dragged text format object on the input window of the second screen, and then inputs the text format object to the input window.

Although the electronic device according to the above-described embodiment of the present invention is able to immediately display the text format object on the second screen, the electronic device may display the stored image format object on the second screen without any change. More specifically, the electronic device may recognize an input gesture for the image format object from the input tool, and when there is an input for releasing the image format object on the input window of the second screen, the electronic device may, at that time determine to convert the image format object to a text format object, and then input the converted text format object to the input window of the second screen.

Figure 9A:
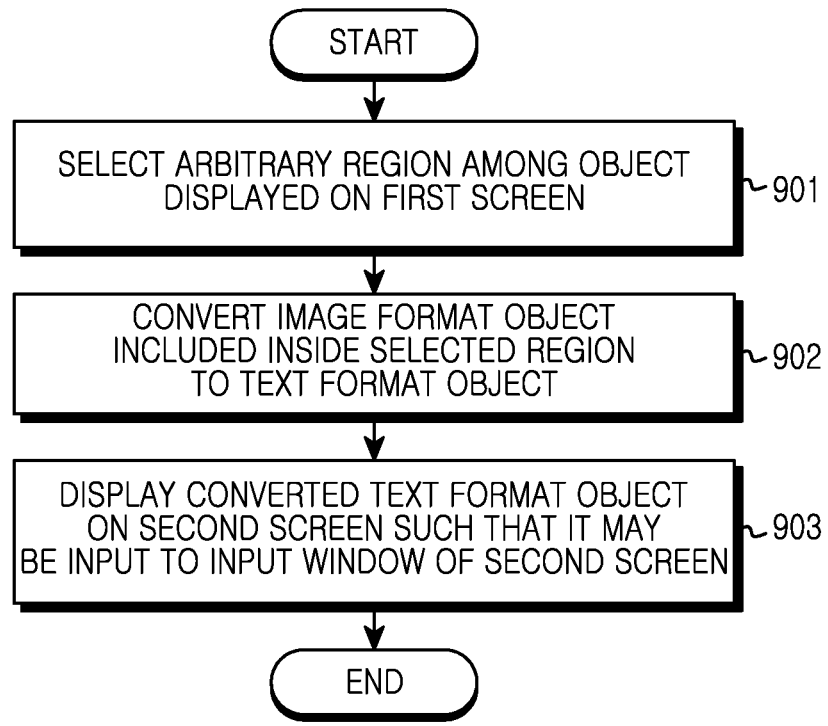
FIG. 9A is a flowchart illustrating a method of an electronic device for converting an image format object to a text format object according to an embodiment of the present invention.

FIG. 9A is a flowchart illustrating a method of an electronic device for converting an image format object to a text format object according to an embodiment of the present invention.

Referring to FIG. 9A, first, the electronic device receives a user selection of an arbitrary region from an object displayed on a first screen, at step 901. More specifically, the electronic device receives image format information including specific information to enable an input tool to select the specific information among the image format information displayed on the first screen.

Next, the electronic device converts an image format object included inside the selected region to a text format object, at step 902. More specifically, the electronic device recognizes the image format object included inside the selected region using an optical character recognition function, stores the recognized image format object in one of one or more set regions, and then calls the stored image format object to convert the image format object included inside the selected region to a text format object.

Next, the electronic device displays the converted text format object on the second screen to enable input of the converted text format object to the input window of the second screen, at step 903. More specifically, the electronic device displays the converted text format object such that it does not to overlap the input window displayed on the second screen, thereby allowing the converted text format object to be input to the input window of the second screen. When a keypad window is displayed on the second screen, the electronic device displays the converted text format object so that the converted text format object does not overlap the keypad window.

Figure 9B:
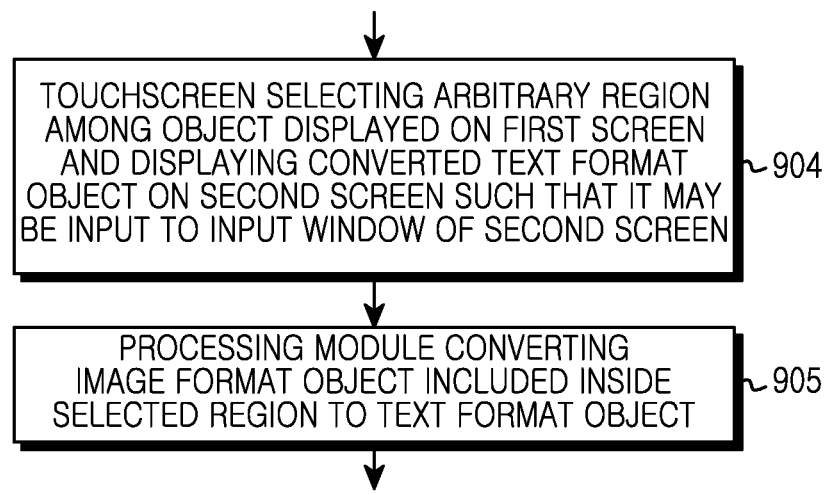
FIG. 9B is a diagram illustrating an electronic device for converting an image format object to a text format object according to an embodiment of the present invention.

FIG. 9B is a diagram illustrating an electronic device for converting an image format object to a text format object according to an embodiment of the present invention. First, as illustrated in FIG. 9B, the touchscreen 904 of the electronic device receives input of a selection of an arbitrary region from among an object displayed on a first screen, and displays a converted text format object on a second screen so that the converted text format object may be input to the input window of the second screen. More specifically, the touchscreen 904 of the electronic device enables an input tool to input a selection of specific information from among image format information displayed on the first screen, and when the specific information is converted to a text format object, displays the converted text format object such that it does not overlap the input window displayed on the second screen, so that the converted text format object may be input to the input window of the second screen, and also displays the converted text format object such that it does not overlap a displayed keypad window.

A processor module 905 of the electronic device converts an image format object included inside a selected region to a text format object. More specifically, the processor module of the electronic device recognizes the image format object included inside the selected region using an optical character recognition function, stores the recognized image format object in one of at least one set region, and then calls the stored image format object to convert the image format object included inside the selected region to a text format object.

Figure 10:
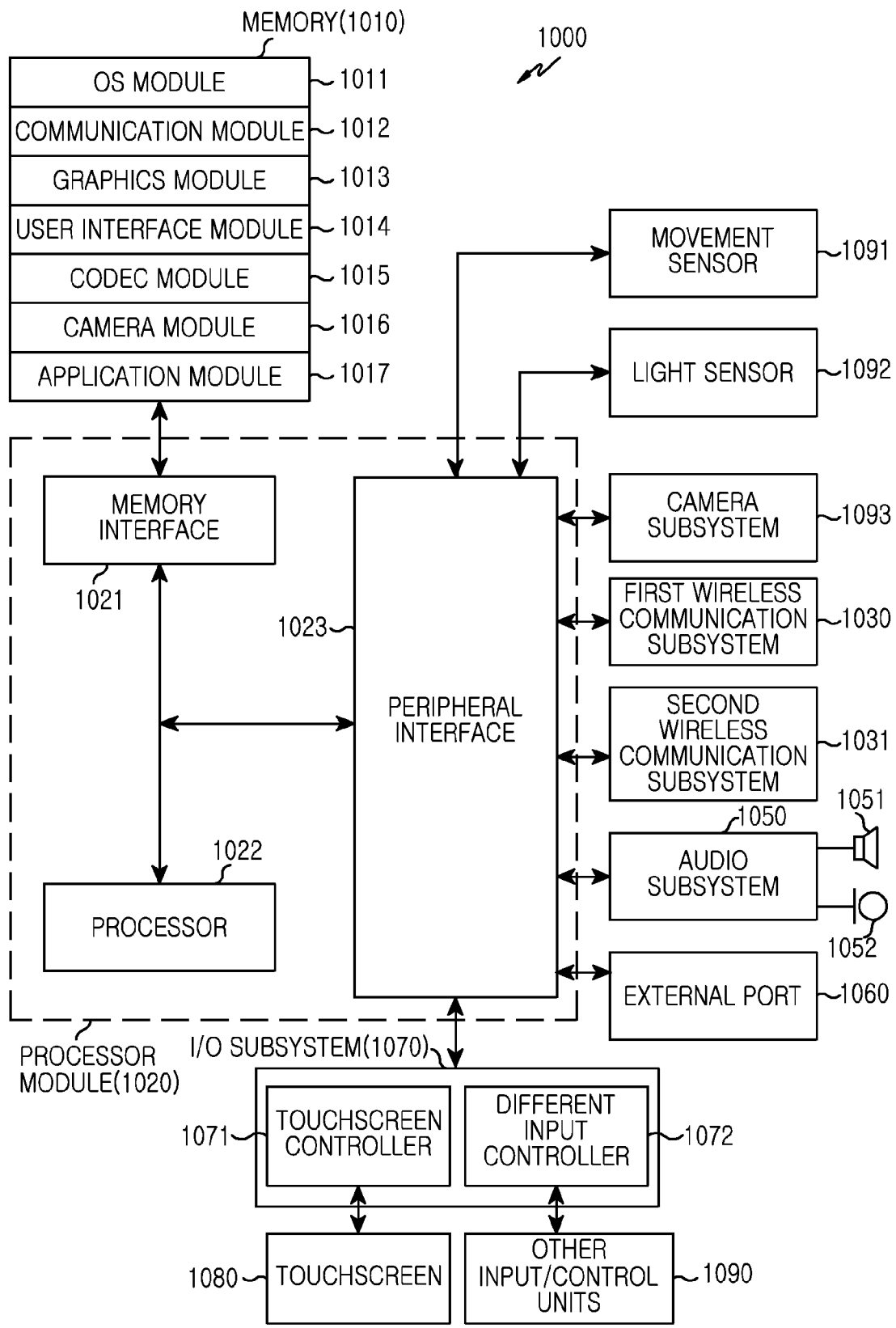
FIG. 10 is a block diagram illustrating an electronic device according to an embodiment of the present invention.

FIG. 10 is a block diagram illustrating an electronic device according to an embodiment of the present invention. The electronic device may be a portable electronic device. For example, the electronic device may be an apparatus such as a portable terminal, a mobile phone, a mobile pad, a media player, a tablet computer, a handheld computer, or a Personal Digital Assistant. The electronic device may also be an arbitrary portable electronic device including an apparatus combining various functions from among these devices.

The electronic device 1000 includes a memory 1010, a processor module 1020, a first wireless communication subsystem 1030, a second wireless communication subsystem 1031, an external port 1060, an audio subsystem 1050, a speaker 1051, a microphone 1052, an Input/Output (I/O) subsystem 1070, a touchscreen 1080, and other input or control units 1090. The electronic device 1000 may alternatively include a plurality of memories 1010 and/or external ports 1060.

The processor module 1020 includes a memory interface 1021, at least one processor 1022, and a peripheral interface 1023. The entire processor module 1020 may also be considered as a processor. According to an embodiment of the present invention, the processor module 1020 converts an image format object included inside a selected region to a text format object. The processor module 1020 also recognizes the image format object included inside the selected region using an optical character recognition function, stores the recognized image format object in one of one or more set regions, and initiates a call according to the stored image format object. When displaying one or more storage regions on the first screen, the processor module 1020 may drag and move an image format object to one of the displayed one or more storage regions. Also, when storage regions are not displayed on the first screen, the processor module 1020 may drag and move the image format object to a set region. The processor module 1020 determines the number of fields of input windows to be displayed on the second screen, and when the determined number of the fields is more than one, the processor module 1020 deletes a separator included in the image format object, separates the image format object by the determined number of the fields to convert the separated image format object to editable text format objects. Also, the processor module 1020 may drag the image format object to the input window of the second screen, release the dragged image format object on the input window of the second screen, and determine the image format object released on the input window of the second screen has been converted to a text format object and input to the input window of the second screen. Also, the processor module 1020 may determine the image format object is converted to a text format object and operated in advance before a release operation, and determine the text format object is moved to the second screen in substitution for the image format object. Also, the processor module 1020 may drag a text format object included inside a selected region to the second screen, release the dragged text format object on the input window of the second screen, and determine the text format object released on the second screen has been input to the input window of the second screen.

The processor 1022 executes various software programs to perform various functions for the electronic device 1000, and also performs a process and a control for voice communication and data communication. The processor 1022 also executes a specific software module (an instruction set) stored in the memory 1010 to perform specific various functions corresponding to the module, i.e., the processor 1022 performs various methods according to embodiments of the present invention in cooperation with software modules stored in the memory 1010.

The processor 1022 may include (not shown) one or more data processors, image processors, or a CODEC. Data processors, the image processors, or the CODEC may be configured separately, and may be configured using a plurality of processors performing different functions. The peripheral interface 1023 connects the I/O subsystem 1070 and various peripherals to the processor 1022 and the memory 1010 via the memory interface 1021.

The external port 1060 is used for directly connecting a portable electronic device (not shown) to another electronic device or indirectly connecting the portable electronic device to another electronic device via a network (for example, the Internet, an Intranet, a wireless Local Area Network (LAN), etc.). Though not limited thereto, the external port 1060 may be, for example, a Universal Serial Bus (USB) port or a FIREWIRE port, etc.

A movement sensor 1091 and a first light sensor 1092 are coupled to the peripheral interface 1023 to enable various functions. For example, the movement sensor 1091 and the first light sensor 1092 may be coupled to the peripheral interface 1023 to enable detection of movement of the electronic device and detection of light from outside of the electronic device 1000. Other sensors, such as a position measurement system, a temperature sensor, or a living body sensor may be coupled to the peripheral interface 1023 to perform related functions.

A camera subsystem 1093 performs a camera function such as a photo and video clip recording.

The light sensor 1092 may be, for example, a Charged Coupled Device (CCD) or a Complementary Metal-Oxide Semiconductor (CMOS) device.

A communication function is performed via one or more of the wireless communication subsystems 1030 and 1031. The wireless communication subsystems 1030 and 1031 may include, for example, a Radio Frequency (RF) receiver and an RF transceiver and/or a light (for example, an infrared) receiver and a light transceiver. The first communication subsystem 1030 and the second communication subsystem 1031 may differ according to respective a communication network via which each of first communication subsystem 1030 and the second communication subsystem 1031 communicates. For example, though not limited thereto, the communication networks may include a communication subsystem designed to operate via a Global System for Mobile Communication (GSM) network, an Enhanced Data GSM Environment (EDGE) network, a Code Division Multiple Access (CDMA) network, a Wide (W)-CDMA network, a Long Term Evolution (LTE) network, an Orthogonal Frequency Division Multiple Access (OFDMA) network, a Wireless Fidelity (Wi-Fi) network, a WiMax network and/or a Bluetooth network, etc. The first wireless communication subsystem 1030 and the second wireless communication subsystem 1031 may also be formed as one merged wireless communication subsystem.

The audio subsystem 1050 is coupled to the speaker 1051 and the microphone 1052 to control voice recognition, voice duplication, digital recording, and input/output of an audio stream, such as with respect to a telephone function. Accordingly, the audio subsystem 1050 communicates with a user via the speaker 1051 and the microphone 1052. The audio subsystem 1050 receives a data stream via the peripheral interface 1023 of the processor module 1020, and converts the received data stream to an electric stream. The converted electric stream (electric signal) is transferred to the speaker 1051. The speaker 1051 converts the electric signal to a sound wave audible by a person and outputs the audible sound wave. The microphone 1052 converts a sound wave transferred from a person or other sound sources to an electric stream. The audio subsystem 1050 receives the converted electric stream from the microphone 1052. The audio subsystem 1050 converts the received electric stream to an audio data stream, and transmits the converted audio data stream to the peripheral interface 1023. The audio subsystem 1050 may include (not shown) an attachable and detachable ear phone, head phone, or head set.

The I/O subsystem 1070 includes a touchscreen controller 1071 and a different input controller 1072. The touchscreen controller 1071 is coupled to the touchscreen 1080. Though not limited thereto, according to an embodiment of the present invention, the touchscreen 1080 and the touchscreen controller 1071 may detect a contact and movement or stoppage of these using an arbitrary multi-touch detect technology including other proximity sensor arrangements or other elements as well as a capacitive, resistive, infrared, and surface acoustic wave technologies for determining one or more contact points with the touchscreen 1080. The different input controller 1072 is coupled to the other input/control units 1090. The other input/control units 1090 may include, for example, one or more buttons, a rocker switch, a thumb-wheel, a dial, a stick, and/or a pointer device such as a stylus.

The touchscreen 1080 provides an input/output interface between the electronic device 1000 and a user by transferring a user's touch input to the electronic device 1000. The touchscreen 1080 also shows a visual output from the electronic device 1000 to the user. This visual output appears in the form of, for example, text, graphics, a video, and a combination thereof.

The touchscreen 1080, may include any of various displays, such as a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED. According to an embodiment of the present invention, the touchscreen 1080 may select an arbitrary region among objects displayed on the first screen, and display a converted text format object on the second screen so that the converted text format object may be input to the input window of the second screen. The touchscreen 1080 may also stop displaying first screen, display the second screen, and allow an object to be displayed such that it does not overlap the input window displayed on the second screen. The touchscreen 1080 may also display an object such that it does not overlap one or more of the input window, a pop-up window, and a keypad window displayed on the second screen, and select an arbitrary region among text format objects displayed on the second screen.

The memory 1010 is coupled to the memory interface 1021. The memory 1010 may include (not shown) a high speed random access memory such as one or more magnetic disk storage units, and/or a non-volatile memory, one or more optical disk storage units and/or a flash memory (for example, NAND, NOR).

The memory 1010 stores software. Software elements include an Operating System (OS) module 1011, a communication module 1012, a graphics module 1013, a user interface module 1014, an MPEG module 1015, a camera module 1016, one or more application modules 1017, etc.

Also, since a module that is a software element may be expressed as a set of instructions, the module may be expressed as an instruction set. Each module may also be expressed as a program. The OS software 1011 (e.g., WINDOWS, LINUX, Darwin, RTXC, UNIX, OS X, or a built-in OS, such as VxWorks) includes various software elements for controlling a general system operation. This general system operation control denotes, for example, memory management and control, storage hardware (device) control and management, power control and management, etc. This OS software also performs a function for swift communication between various hardware (i.e., devices) and software elements (i.e., modules). According to an embodiment of the present invention, when determining that there is at least a predetermined minimum difference of a set feature vector value and a feature vector value is maintained within a set feature vector value range, the memory 1010 may register a sound source file portion corresponding to a time from which a feature vector value serving as a reference has been extracted in a highlight estimation section.

The communication module 1012 enables communication with another electronic device such as a computer, a server and/or a portable terminal, etc. via the wireless communication subsystems 1030 and 1031 or the external port 1060. When the second screen corresponds to an application capable of requesting call transmission, and a text format object includes a phone number, the communication module 1012 may request call transmission to the number.

The graphics module 1013 includes various software elements for providing and displaying graphics on the touchscreen 1080. Such graphics may include, for example, text, a web page, an icon, a digital image, a video, an animation, etc.

The user interface module 1014 includes various software elements regarding a user interface. The user interface module 1014 includes contents regarding the manner in which a state of the user interface changes or conditions under which the state of the user interface changes.

The CODEC module 1015 may include (not shown) a software element regarding encoding and decoding of a video file. The CODEC module 1015 may also include a video stream module such as an MPEG module and/or an H204 module. The CODEC module 1015 may include CODEC modules for various audio files such as AAA, AMR, WMA, etc. The CODEC module 1015 also includes instruction sets corresponding to methods according to embodiments of the present invention.

The camera module 1016 includes a camera-related software element enabling camera-related processes and functions.

The application module 1017 includes a browser, an e-mail, an instant message, word processing, keyboard emulation, an address book, a touch list, a widget, Digital Right Management (DRM), voice recognition, voice duplication, a position determining function, a location based service, etc.

Also, various functions of the electronic device according to the present invention mentioned above and to be mentioned below may be executed by one or more processing streams, hardware including an Application Specific Integrated Circuit (ASIC), software, or a combination thereof.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention is not limited to the above-described embodiments but is defined by the appended claims and the equivalents thereof.

What is claimed is:

1. A method in an electronic device for converting an image format object to a text format object, the method comprising:
  selecting a region to include an image format object within an image displayed on a first screen based on a first input;
  detecting a second input for moving the selected region;
  storing the selected region in response to detecting that the second input is moved to a specific region;
  displaying an input window and the selected region on a second screen in response to receiving an instruction for calling the selected region;
  converting the image format object included inside the selected region to a text format object in response to detecting that a third input moves the selected region to the input window of the second screen; and
  inputting and displaying the converted text format object in the input window of the second screen.

2. The method of claim 1, wherein the method further comprises, before converting the image format object, performing optical character recognition on the selected region to determine the image format object included inside the selected region, and
  wherein the method further comprises:
  before converting the image format object, storing the image format object in the specific region;
  ending display of the first screen and displaying the second screen; and
  initiating a call to a destination indicated by the converted text format object.

3. The method of claim 2, wherein the specific region comprises at least one storage region of a multi-task bar for a multi-task function to display on the first screen or the second screen.

4. The method of claim 2, wherein the specific region comprises at least one storage region of an indicator zone to display on the first screen or the second screen.

5. The method of claim 1, wherein converting the image format object included inside the selected region to the text format object comprises:
  determining a number of fields of the input window displayed on the second screen;
  deleting, upon determining that the number of fields of the input window is more than one, a separator included in the image format object; and
  separating the image format object according to the determined number of fields and converting the separated image format object to an editable text format.

6. The method of claim 1, wherein inputting and displaying the converted text format object in the input window of the second screen comprises:
  displaying the text format object such that the text format object does not overlap at least one of the input window, a pop-up window, and a keypad window displayed on the second screen.

7. The method of claim 1, further comprising:
  detecting a user gesture according to dragging and releasing the image format object to the input window of the second screen;
  converting the image format object to the text format object in response to detecting the user gesture; and
  inputting the converted text format object in the input window of the second screen.

8. The method of claim 7, further comprising:
  converting the image format object to the text format object when the user gesture is moved to the specific region in the first screen; and
  storing the text format object to a storage place corresponding to the specific region.

9. The method of claim 1, further comprising:
  storing the image format object in a storage place corresponding to the specific region, if the second input is moved to the specific region in the first screen.

10. The method of claim 1, further comprising:
  displaying the first screen including an image and the second screen including an input window;
  selecting an image format object in the image of the first screen;
  detecting a gesture to move the selected object from the first screen to the input window of the second screen;
  converting the image format object to the text format object in response to the gesture; and
  inputting the converted text format object at the input window of the second screen.

11. An electronic device for converting an image format object to a text format object, the electronic device comprising:
  a touchscreen configured to select a region including an image format object within an image displayed on a first screen based on a first input; and
  a processor module configured to:
    detect a second input for moving the selected region;
    store the selected region, in response to detecting that the second input is moved to a specific region;
    display an input window and the selected region on a second screen in response to receiving an instruction for calling the selected region;
    convert the image format object included inside the selected region to a text format object in response to detecting that a third input moves the selected region to the input window of the second screen; and
    input and display the converted text format object in the input window of the second screen.

12. The electronic device of claim 11, wherein the processor module is configured to:
  recognize the image format object included inside the selected region using an optical character recognition function;
  store the recognized image format object in the specific region;
  the touchscreen is configured to end display of the first screen and display the second screen; and
  the processor module is configured to initiate a call to a destination indicated the converted text format object.

13. The electronic device of claim 12, wherein the specific region comprises at least one storage region of a multi-task bar for a multi-task function to display on the first screen or the second screen.

14. The electronic device of claim 12, wherein the specific region comprises at least one storage region of an indicator zone to display on the first screen or the second screen.

15. The electronic device of claim 11, wherein the processor module is configured to:
  determine a number of fields of the input window displayed on the second screen;
  delete, upon determining that number of fields of the input window is greater than one, a separator included in the image format object; and
  separate the image format object according to the determined number of fields to convert the separated image format object to an editable text format object.

16. The electronic device of claim 11, wherein the touchscreen is configured to display the text format object such that the text format object does not overlap at least one of the input window, a pop-up window, and a keypad window displayed on the second screen.

17. The electronic device of claim 11, wherein the processor module is configured to:
   detect a user gesture according to dragging and releasing the image format object to the input window of the second screen;
   convert the image format object to the text format object in response to detecting the user gesture; and
   input the converted text format object to the input window of the second screen.

18. The electronic device of claim 17, wherein the processor module is configured to:
   convert the image format object to the text format object when the user gesture is moved to the specific region in the first screen, and
   store the text format object to a storage place corresponding to the specific region.

19. The electronic device of claim 11, wherein the processor module is configured to:
   store the image format object to a storage place corresponding to the specific region, when the second input is moved to the specific region in the first screen.

20. The electronic device of claim 11, wherein the process module is configured to:
   control display of the first screen including an image and the second screen including an input window;
   select an image format object in the image of the first screen;
   detect a gesture to move the selected object from the first screen to the input window of the second screen;
   convert the image format object to the text format object in response to the gesture; and
   input the converted text format object at the input window of the second screen.

* * * * *